United States Patent [19]

Bagby

[11] Patent Number: 4,911,743
[45] Date of Patent: Mar. 27, 1990

[54] GLASS STRUCTURE STRENGTHENING BY ETCHING

[75] Inventor: John P. Bagby, Anaheim Hills, Calif.
[73] Assignee: Hughes Aircraft Company, Los Angeles, Calif.
[21] Appl. No.: 344,438
[22] Filed: Apr. 25, 1989

Related U.S. Application Data

[63] Continuation of Ser. No. 215,084, Jul. 5, 1988, abandoned, which is a continuation-in-part of Ser. No. 868,829, May 29, 1986, abandoned.

[51] Int. Cl.$^4$ .............................................. C03C 15/02
[52] U.S. Cl. ........................................ 65/31; 65/30.13
[58] Field of Search ................... 65/30.13, 31, 62, 94, 65/97, 102, 105, 111, 112

[56] References Cited

U.S. PATENT DOCUMENTS

| | | | |
|---|---|---|---|
| 51,776 | 12/1865 | Buckley | 65/62 |
| 2,398,708 | 4/1946 | Hendrix | 65/31 UX |
| 3,843,472 | 10/1974 | Toussaint et al. | 65/31 X |
| 3,951,634 | 4/1976 | Hall et al. | 65/104 |
| 4,033,743 | 7/1977 | Scott, Jr. et al. | 65/30 |
| 4,486,213 | 12/1984 | Lentz et al. | 65/102 |

OTHER PUBLICATIONS

Strength and Strengthening of Glass Part One (concluded) Strength of Glass, Fred M. Ernsberger, "The Glass Industry", Sep. 1966, pp. 481–487.

*Primary Examiner*—Arthur Kellogg
*Attorney, Agent, or Firm*—William J. Streeter; Wanda K. Denson-Low

[57] ABSTRACT

A method of producing a superior quality of glass or other brittle material. The resulting end product is substantially stronger than conventional glass and exhibits greater strength consistency than was previously known. The techniques include various combinations of operations including substantially reducing the thickness of a blank of raw material; preparing formed edges including chamfered edges, rounded edges, and undercut edges; super polishing all edges and surfaces of a glass item; tempering the glass either thermally, chemically, or both; super polishing again after the tempering operation; and etching the glass after one or more of several steps in the process.

15 Claims, 4 Drawing Sheets

FIG. 1A
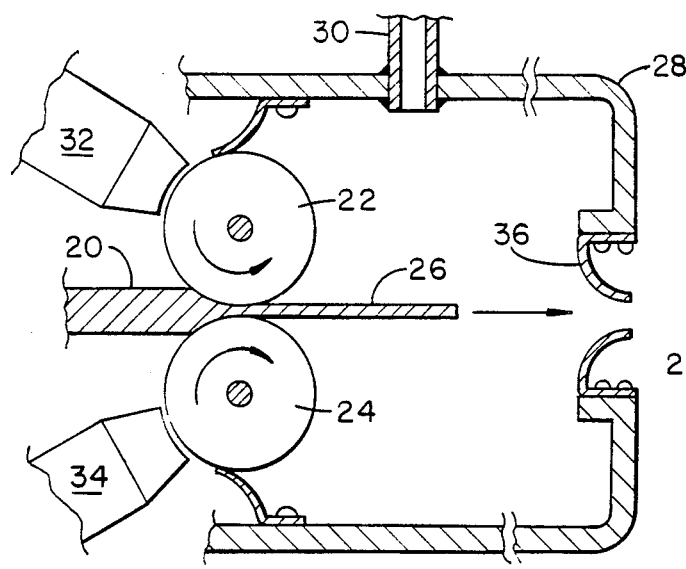
FIG. 1B
FIG. 2
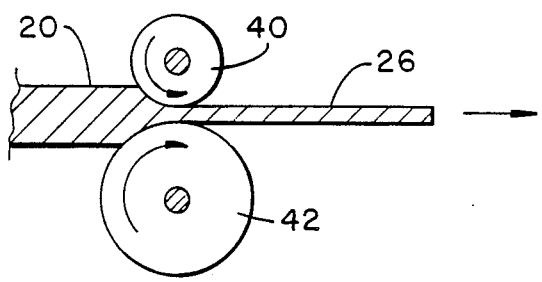
FIG. 3
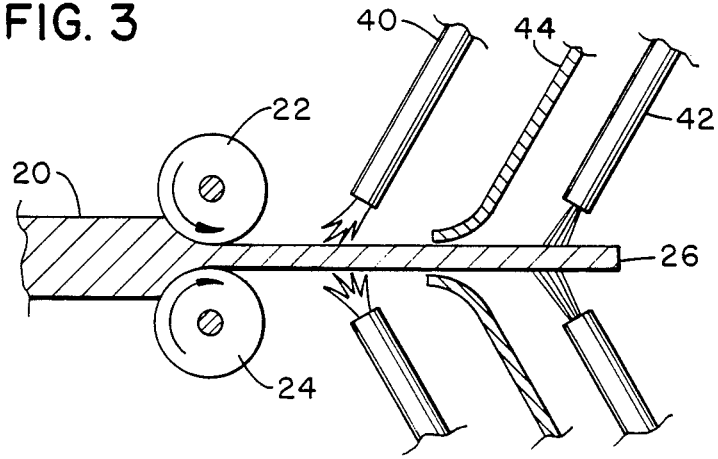

GLASS STRUCTURE STRENGTHENING BY ETCHING

This application is a continuation of application Ser. No. 07/215,084 filed July 5, 1988 now abandoned which is a continuation-in-part of copending application Ser. No. 06/868,829 filed on May 29, 1986.

BACKGROUND OF THE INVENTION

I. Field of the Invention

This invention relates generally to a method of producing a superior quality of glass or other brittle material resulting in an end product which is substantially stronger than conventional glass or other brittle material and exhibits greater strength consistency than was previously known. Which is a continuation-in-part of copending application Ser. No. 06/868,829 filed on May 29, 1986.

II. Description of the Prior Art

In the past, "tempered" glass was used for strong part requirements. Over the years, a process known variously as "chemical tempering", "ion exchange", or "chemical strengthening" came to be employed to do the same thing. These processes render the outside of a glass in compression while the inside is in tension. "Tempering" in glass is not the same as in metals. It merely consists of rapid cooling (actually "quenching") from the melt, or other high temperature, which causes the outside skin to "solidify" first (glass is a technical liquid of nearly infinite viscosity, not a solid), "Chemical" tempering or "ion exchange" or "chemical strengthening" accomplishes the same result by replacing, for example, sodium ions with "fatter" potassium ions in the surface region. This squeezes the surface together, causing compression there. When the glass beam is bent, the tension side first has to lose all the residual compression before going into tension. Either process can result in a part acting as if it could survive between 30,000 psi and 45,000 psi in tension (instead of just bending, alone). Some parts have approached 60,000 psi in this way, but in thick section only, and not reliably or repeatedly.

The compressive strength of glass is not usually a problem. This is primarily due to the fact that existing flaws and micro cracks in the surface do not propagate under compressive stress. Compressive strengths of 250,000 psi are commonly observed.

One problem with the prior art is that it is not reliable statistically. The distribution of yield point for known glass is skewed, with a long tail off in the high strength direction and a short cutoff at lower values. Thus, one can reliably count on achieving only a fraction of the attainable value in tension.

Throughout this disclosure, the term "glass" is intended to mean not only those materials commonly known as glass, but also ceramics, and vitreous materials and other substitutes therefor. It even applies to some "metals" (e.g., germanium, and silicon).

SUMMARY OF THE INVENTION

It was with recognition of the state of the prior art with regard to glass that the present invention was conceived and has now been reduced to practice. In brief, this invention comprises using combinations of several new, as well as known, methods of improving the properties of glass-type materials simultaneously, or in sequence, in new arrangements for manufacturing glass parts such as mirrors, focal plane film plates, microscope slides, fusible links, non ferrous parts, and the like. To the extent known, these various arrangements of sequences and methods are novel in the art, They combine special preparation of the edges (to reduce stress concentration points), superior preparation of the surfaces (to reduce micro cracks), partial etching of all surfaces and edges (to reduce the sharper edges in any digs, scratches, gouges, and micro cracks to rounded edges and scallops, or even removal of smaller ones), "tempering" (raid liquid or air quenching) to render the outside surfaces in compression, and chemical tempering or strengthening (to render the outside surfaces in compression by ion exchange).

Most glasses fail prematurely in tension due to some previously known and some previously unknown causes. This invention renders a stronger, more flexible "glass" product. This prevents premature failure in tension, or on the tension side of a beam of glass. The invention also provides a way to obtain a wider range of choices of thicknesses than previously available, and allows for a thinner product as well, all without special mill runs of some certain size.

In tests of specimens fabricated according to one method or sequence of the present invention, a bending strength in excess of 2,000 psi has been achieved in tests of one embodiment of the invention, namely, glass plate formed with rounded and felt polished edges and chemically strengthened. In a part formed with sharp corners on flat, polished edges, 54,000 psi has been achieved in bending tests. These values are roughly double the best which have been achieved in the prior art. Since the present invention specifically attacks those weak areas which previously caused random and premature failure, more consistency in reliable results is to be expected than heretofore. That is, a more normal distribution of yield strengths about the mean value can now be achieved than was known to the prior art. Indeed, using parts of the present invention, even untempered glass coupons have been made which reach 120,000 psi, exceeding the previously customary values of untempered glass in bending of approximately 10,000 psi. Some special coupons have reached 400,000 psi without tempering or chemical strengthening.

The impact of the invention is to render such diverse items as glass microscope slides, glass photographic plates, glass windows of spacecraft and automobiles and aircraft all more durable and bendable by reason of greater strength and greater repeatability or consistency in the product's strength. Additionally, glass optical components can now be employed in formerly unacceptable environments where their electrical nonconductivity and non-magnetic properties are superior to metals (e.g. fusible links and ion engine dynamometer struts).

As another feature of the present invention, it was discovered that etching of one thickness and type of glass surface to a depth of between 100 to 400 microinches produced an unexpected further increase in the breaking stress of the glass over the improvements found with random depth etching. The breaking stress of the glass, although improved, was found to be substantially less when etching was carried out to depths less than or greater than the 100 to 400 microinch range.

Other and further features, objects, advantages, and benefits of the invention will become apparent from the following description taken in conjunction with the following drawings. It is to be understood that both the foregoing general description and the following detailed description are exemplary and explanatory but are not restrictive of the invention. The accompanying drawings, which are incorporated in and constitute a part of this invention, illustrate some of the embodiments of the invention and, together with the description, serve to explain the principles of the invention in general terms.

DETAILED DESCRIPTION OF THE DRAWINGS

In the Drawings:

FIG. 1A is a detail side elevation diagrammatic view, certain parts being cut away and in section, diagrammatically illustrating one step of a process embodied by the invention;

FIG. 1B is a detail side elevation diagrammatic view, in section, diagrammatically illustrating an operation which can be used, if desired, in combination with the mechanism illustrated in FIG. 1A;

FIG. 2 is a detail side elevation diagrammatic view, partially in section, which illustrates an operation similar to FIG. 1A in which the rollers are each of different diameter;

FIG. 3 is a detail side elevation diagrammatic view, partially in section, which illustrates an operation similar to FIG. 1A which is immediately followed by a tempering operation;

FIG. 4B is a side elevation view of a portion of a sheet of glass after it has been subjected to a fine grinding edge operation;

FIG. 4C is a side elevation view of a portion of a sheet of glass after it has been subjected to a super polishing edge operation;

Figure 6:
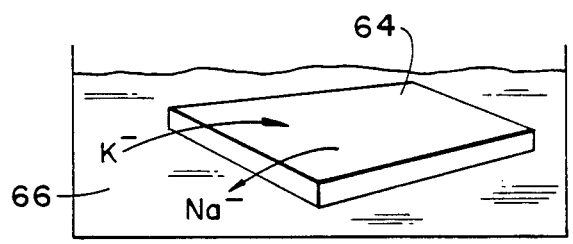
Figure 7:
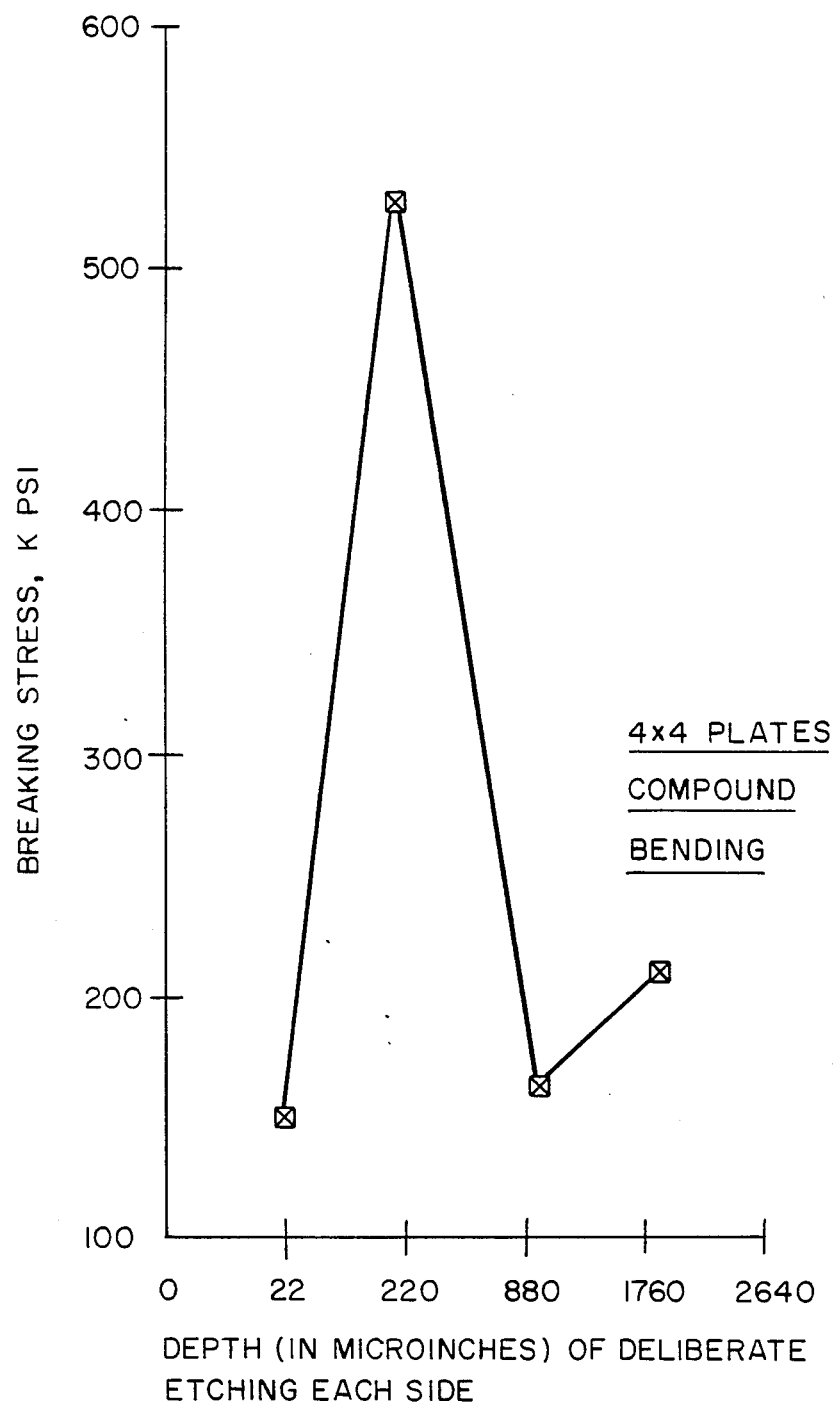

FIGS. 5C, 5D, and 5E illustrate, successively, side elevation views of a portion of a sheet of glass whose edges have been, respectfully, substantially undercut, moderately undercut, and slightly undercut;

FIG. 6 is a schematic illustration of the chemical strengthening or ion exchanging operation, yet another operation employed in the process of the invention; and FIG. 7 is a graph which depicts breaking stress versus depth of etching according to one embodiment of the invention.

DESCRIPTION OF THE PREFERRED EMBODIMENTS

Figure 1:
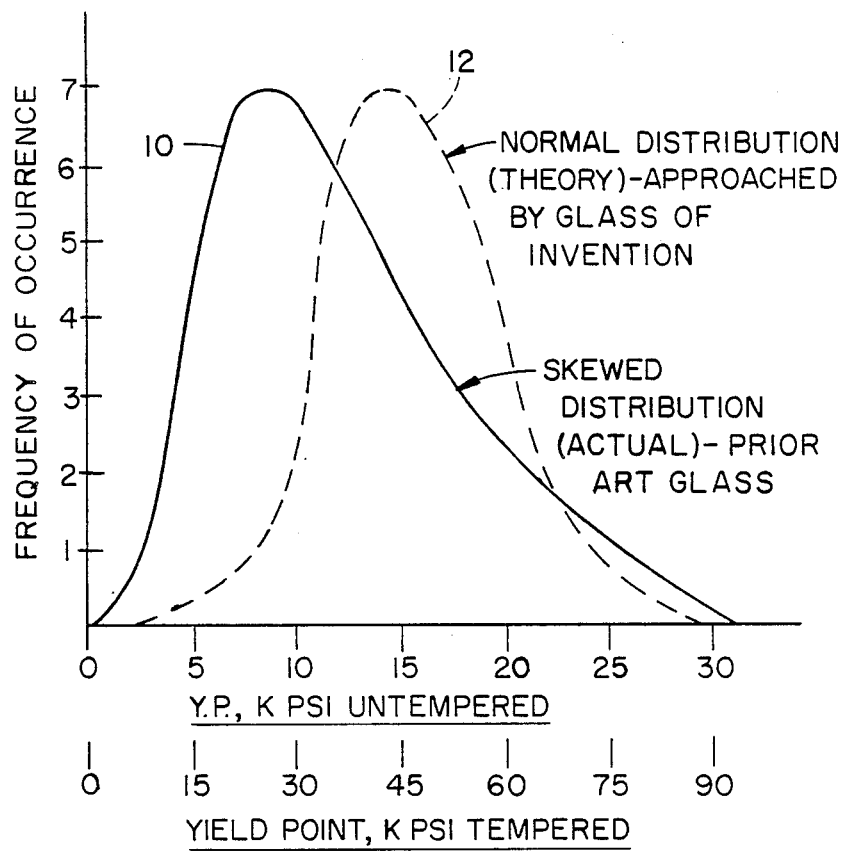
FIG. 1 is a graph which depicts the distribution curves, respectively, of prior art glass and of glass produced according to the invention.

It has previously been noted that one problem with the prior art is that it is not reliable statistically. That is, the yield point for a randomly selected glass item is not accurately predictable as are yield points for most other common materials. This situation is graphically presented in FIG. 1 according to which a distribution curve 10 for a typical glass item is superimposed with normal or theoretical distribution curve 12. As is clearly seen, the curve 10 is skewed to the left, or in the low strength direction, with a long tail off in the high strength direction. It is noteworthy that the same skewed condition exists, whether the glass is tempered or untempered, the only difference being that tempered glass, as expected, has a higher yield point than untempered glass.

By reason of the present invention, not only is the strength of glass increased to a substantial degree, the distribution curve for glass so treated is substantially closer to the shape indicated by the curve 12. Glass items in the form of 1 inch by 10 inch samples produced according to the invention, that is, after either thermal tempering, or after chemical tempering, or after etching alone in the manner disclosed, exhibit a yield point distribution which lies generally in the range of 30K psi to 65K psi and exhibit a standard deviation of 15.7K psi. Of course it will be understood that such glass items which have been subjected to combinations of two or three of these procedures will exhibit still further improved characteristics. It has been found that in its raw material form, thicker glass has better properties due to increased homogeneity than does thinner glass. This quality is independent of any skin effect, that is, removal of surface imperfections. It is due primarily to contamination by the manufacturing process. For this reason, raw material is best chosen for purposes of the invention which is substantially thicker than the desired end product, then is reduced in thickness in some appropriate manner.

As seen in FIG. 1A, raw material 20 such as float glass, or other flat stock, is illustrated being advanced, driven by and between rollers 22 and 24. A thinned down glass sheet 26 exits from the rollers 22 and 24 and can enter a suitable enclosure 28. The enclosure can be filled through an inlet 30 with any suitable gas or liquid to which it may be desired to subject the glass 26 after the rolling operation. It might also be desirable to heat or cool the rollers 22 and 24 relative to the raw material 20 by means of suitable injectors 32 and 34. The glass sheet 26 subsequently passes through a relatively gas- or liquid-tight quasi-sealed opening 36 in the enclosure 28 after which it is subjected to subsequent operations. While the rollers 22 and 24 can serve to drive the glass sheet 26 in a forward direction as well as to reduce its thickness, a suitably operated claw mechanism 38 can be operated to grip the glass sheet 26 and draw it through the rollers 22 and 24 should that be desired. Additionally, as illustrated in FIG. 2, it might be desirable to utilize rollers 40 and 42 of different diameters (the relative sizes of the rollers are exaggerated) to prevent curling of the glass sheet 26. It is also within the scope of the invention for the rollers 22 and 24 to remain unpowered and to allow the claw mechanism 38 to draw the glass sheet 26 through the rollers, or to have rollers 22 and 24 remain stationary and to draw the glass sheet 26 as in an extruding operation.

Although the procedures which have just been described have been referred to as a rolling operation, it might also be considered to be a re-rolling operation since the raw material 20 may previously have been subjected to a rolling operation, unless it had been "floated" (on tin, for example) or poured out to a particular size in manufacture.

Figure 3A:
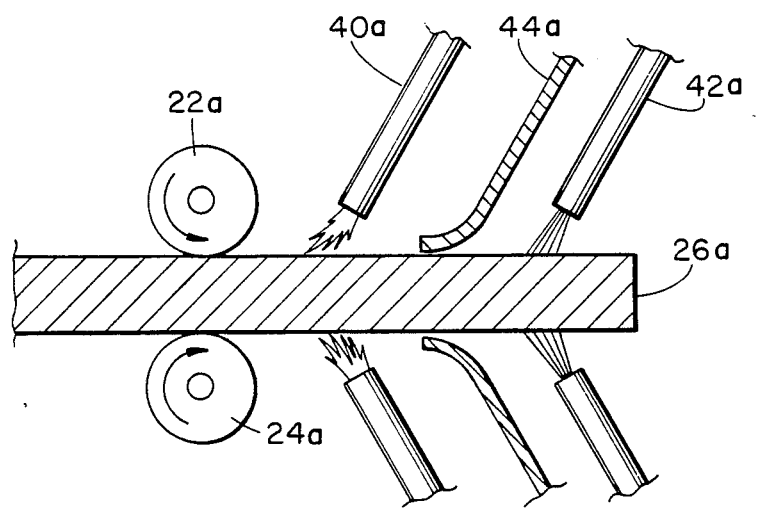
FIG. 3A is a detail side elevation diagrammatic view, partially in section, depicting a rapid quenching action being applied to a sheet of material already having the desired thickness.

As illustrated in FIG. 3, the glass sheet 26 emerging from the rollers 22 and 24 can be flame heated, then subjected to a rapid quench to thermally "temper" it. That is, suitably fueled flame jets 40 can be employed to heat the glass after which cooling jets 42 using cool air, other gasses, or oil is directed against the glass sheet 26 thereby subjecting it to a quench. The extent of "tempering" is a function of the rapidity of the quench. Barriers 44 can be used to separate the flame jets 40 from the cooling nozzles 42. FIG. 3A depicts such rapid quenching action being applied to a sheet of material already having the desired thickness, in order to thermally post temper an already prepared part. In FIG. 3A, the components 22a, 24a, 26a, 40a, 42a, and 44a re generally equivalent to the components 22, 24, 26, 40, 42, and 44, respectively, illustrated in FIG. 3, except that in his instance, the glass 26 already has the desired thickness.

Although the step of reducing the thickness of the raw material 20 has just been described as being performed by a rolling operation, it will be appreciated that for purposes of the invention, this step can be performed in other suitable ways as, for example, by grinding or by chemical milling.

Figure 4A:
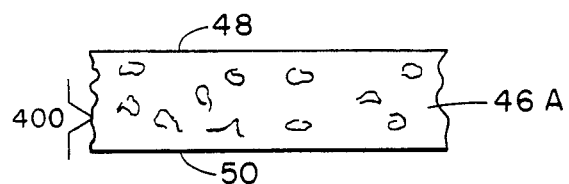
FIG. 4A is a side elevation view of a portion of a sheet of glass in its "as cut" edge condition.

After the glass sheet 26 has been reduced in thickness, as desired, and before any appropriate thermal or chemical tempering operations have been performed, it may be desirable to divide the glass 26 into discrete items such as indicated by a reference numeral 46A, as illustrated in FIG. 4A. The glass item 46A can be separated from the main sheet 26 in any number of ways including sawing, flame cutting, or by scribing, with subsequent breaking along the scribe line. In its as cut condition, the edge of the glass item 4A exhibits a surface irregularity of approximately 400+/−200 microinches per inch of surface distance. It is subsequently fine ground to a surface irregularity of 100+/−50 microinches per inch of surface distance as indicated in a glass item 46B illustrated in FIG. 4B. Finally, as indicated in FIG. 4C, the edges of a glass item 4C are polished using paper, or felt impregnated with pitch, or a pitch lap until the surface irregularity is no greater than 1.0+/−1.0 microinches per inch of surface distance. This same process illustrated in FIGS. 4A, 4B, and 4C with respect to operations on the edges of the glass item is also performed on all other extensive flat surfaces 48 and 50, but using a full sized pitch lap for the polishing of the larger surfaces.

The procedures just described serve to eliminate sources of fracture initiation in the glass. That is, the smoother the surface of the glass, the greater also will be its strength for a given specimen. Intermediate the steps represented by FIGS. 4B and 4C, or after the step represented by FIG. 4C, it is desirable to etch the edges and surfaces of the glass item. This etching procedure is not a "frosting" process but serves to "round over" sharp demarkations, and smooth out micro crack bottoms. In this way, the surfaces can be prepared for final use and/or for improving the final, polished specimen, since etching reaches into cracks and crevices which would be difficult to reach in the grinding or polishing processes.

In accordance with the present invention, it was discovered that etching of a particular glass surface to remove from about 100 to 400 microinches provided a synergistic increase in glass strength. The preferred degree of etching involves the removal of about 200 microinches. See FIG. 7. The type of glass or brittle material to be etched can be any of the glasses suitable for use in a wide variety of applications including photographic and holographic plates. These glasses include soda-lime-silicate glasses and borosilicate glasses. The glasses are available as float glass from numerous manufacturers who maintain the exact compositions as proprietary information. Other materials (like brittle metals) can also be synergistically improved in accordance with the present invention. The exact value of the etch depth will vary with overall thickness as well as the characteristics of the material itself.

Increase in strength due to etching is most evident at glass thicknesses on the order of 0.10 inch and below. Thicker glasses can be treated, if desired. The surface slope variance of the glass prior to etching is preferably below about 10 microinches per inch and rms roughness below 0.15 microinches. The degree of etching effectiveness will vary depending upon surface irregularities. The improvement provided by etching in accordance with the invention decreases when slope variance is above 25 microinches and rms roughness is above 0.700 microinches.

Etching to levels in the 100 to 400 microinch range is accomplished according to any of the known chemical etching processes utilizing hydrofluoric acid and nitric acid. Processes utilizing solutions of ammonium fluoride/ammonium bifluoride may also be used to provide the desired degree of etching. The various concentrations of etching solutions along with the time and temperature conditions under which etching is conducted can be varied widely as is conventionally known to achieve the desired degree of etching for the particular glass being strengthened. However, the best results are obtained with etching at room temperature for longer time periods so that uniform etching can be achieved with reasonable stirring activity.

Preferably, the type of stress versus breaking chart shown in FIG. 7 will be prepared for each particular material, size and shape to determine the peak value of breaking stress improvement due to etching. As can be seen from FIG. 7, the increase in breaking stress rises rapidly to a maximum point and then falls again. The maximum breaking stress point is achieved at 200 microinches of surface removal by etching. It is expected that for most other glasses, the breaking stress point maximum will be achieved at or near 200 microinches of etching. The preferred etching range, however, is between 100 to 400 microinches which provides increases in breaking stress of over two times that available when the degree of etching is below or above this desired range. Other brittle materials, such as silicon, beryllium, titanium and fused silica, will have their optimum etching depth determined as shown above.

Figure 5A:
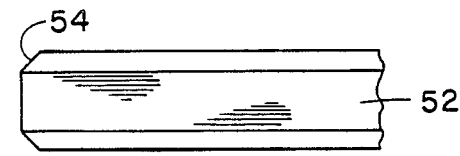
FIG. 5A is a side elevation view of a portion of a sheet of glass whose edges have been suitably chamfered.
Figure 5B:
FIG. 5B is a side elevation view of a portion of a sheet of glass whose edges have been suitably rounded.

Other expedients which have been or could be used with a high degree of success are illustrated in FIGS. 5A through 5E and relate to further operations with respect to the edge portions. For example, in FIG. 5A, a glass item 52 is illustrated having chamfered edges 54. According to another embodiment illustrated in FIG. 5B, a glass item 56 is formed with rounded edges 58. Still another embodiment is illustrated in FIG. 5C which depicts a glass item 60A formed with an undercut edge 62A. The undercut edge 62A has a relatively small radius of curvature. A glass item 60B is illustrated in FIG. 5D having an undercut edge 62B having a relatively moderate radius of curvature. In still another embodiment, a glass item 60C is illustrated in FIG. 5E having an undercut edge 62C with a relatively large radius of curvature. In each of these instances, the purpose is to reduce stress concentrations without adversely affecting the scatter properties of the resulting glass product.

After completion of the foregoing steps, it is desirable to thermally or chemically temper the glass item. Thermal tempering has already been discussed and the procedure is generally illustrated in FIG. 3. Chemical tempering is conceptually illustrated in FIG. 6 which depicts a glass item 64 having the nature of soda lime glass or boro silicate crown glass being immersed in a molten salt bath 66. According to this process, potassium ions are exchanged for sodium ions or sodium ions are exchanged for lithium ions. The magnitude of the ion exchange is a function of time, temperature, and the ions involved. The process results in a "stuffing" action in which the large ions crowd into the space formerly occupied by smaller ions. The process has the result of prestressing the glass to put the entire outer surfaces in compression. Thus, the initial compressive stress must be overcome before applied tensile stresses, which are nearly always the cause of glass failure, can begin to bake effect.

In any event, it has been found that thermal tempering and/or chemical tempering of the glass improves the strength of the glass more dramatically after the procedures illustrated in FIGS. 1A, 1B, 4A-4C, and 5A or 5B have been accomplished.

In some instances it might be desirable to add a step of super polishing, and/or etching, once again after the most recent step of tempering has been completed. This would serve to remove any warping or dimensional irregularities induced by tempering. However, care must be taken that such etching or polishing does not go deep enough to negate the excellent results of the tempering operation.

The general concepts of the invention have now been explained. The following provide examples of specific applications for the methods which have been disclosed and present specific procedures which are used for each of these examples.

EXAMPLE 1

Large lightweight primary and secondary mirrors

These are generally in the form of paraboloids, hyperboloids, spheroids, and the like for optical reflectors used for telescopes, cameras, sensors in numerous environments, such as, industrial, commercial, recreational, military, space, infrared, shipboard, band, sea and air, and space vehicles. Some years ago large lightweighted primary and secondary mirrors were begun to be made of metals. This was due in part to the situation of that period wherein glass or refractory materials were not available which could withstand the shock and vibration that metals were able to do in lighter weight dimensions. This invention allows the extension of glass and refractory materials into the lightweighted domain where they can compete with metal mirrors. The refractory or glass materials are easier to polish and figure to excellence than the metals and would otherwise be very desirable for this application.

Procedure

There would be two different approaches used in this application. The first would be the ion exchanging or chemical hardening of piece that had first been machined out of a blank of solid material. Further, this method could include the etching of the surfaces of the hogged out solid material. This etching could be a separate process or could be combined with the ion exchanging process. The use of the polishing technique applied to the specimen test parts edges would instead be applied to all of the surfaces that had been machined or chemically milled out of the solid blank. Currently, these surfaces have a ground appearance because that is what has been done to them: they have been only roughly prepared. The new teaching shows that roughly prepared surfaces, either by grinding or chemically milling will contain the very type of micro crack structure in the surface that is to be avoided. Thus, the use of felt and paper polishing heads, reaching down into recesses of the mechanically or chemically removed core of the base used for the lightweight primary mirror, will be employed.

The other way of manufacturing large lightweight primary or secondary mirrors according to the teaching of this invention is by the frit bonding of small thin prepared pieces. Frit bonding is known procedure for bonding together separate pieces of glass. The operational pieces have higher melting point than the bonding pieces. By heating the operational layers slightly above the melting point of the bonding pieces with the lower melting point, a "solder" is formed between the two operational pieces, and when cooled they become an integral structure. Such a procedure permits the formation of a light weight glass structure without requiring etching. The difference in the frit bonding technique between what has been done formerly and what would be done under the present invention is that all of the small thin prepared pieces would have their edges carefully polished and rounded so as to avoid any stress concentration sources. Then the entire structure could be etched and/or chemically strengthened.

EXAMPLE 2

Corrector plates for catadioptric optical systems (e.g. Schmidt, Maksutov, Bowers, and Pfenning)

These corrector plates are employed with a spherical primary mirror. They have a very low power and rather thin cross section. The invention is directed now to the thin corrector lens. The problems solved by this invention are the prevention of breakage due to contact with sand, rocks, micrometeorites and shocks and vibrations. Previously corrector plates have had to have been made thicker causing a weight penalty at the front of the telescope or camera creating cantilever (changes in center of gravity) problems, as well as losses in optical transmission. It is desirable to have the center of gravity near the point of focus which would be the optimum position for a Coude' system. Mountings using these systems might be of the Sringfield variety, which permit easy manipulation of the beam and/or use of the beam for multiple purposes. Up to now, optical designs have been forced to place the corrector plate closer to the focus of said systems because of weight and leverage problems. This results in a poor optical performance as to color resolution and field of view, because of not having the corrector plate nearer to the center of curvature.

Procedure

The end product of corrector plates requires high optical homogeneity, i.e. any deviation in the optical path due to inclusions, stria or variations in index must be known and predictable. This would include polarization, dispersion, and the like. The new teaching suggests that the manufacture of such plates should begin with a piece of material that is thicker than required. This would result in a more homogeneous and less (relatively) poisoned blank to begin with. Further, the use of ion exchanging or chemical strengthening might not be an appropriate process due to the difficulties in the boundary layers of the corrector plate from having a different substance (potassium instead of sodium ions) in these regions. Therefore, a tempered product would be more appropriate and the tempering could either be done before or after the final processing. Up until now tempering has not usually been performed after the part has been prepared and up until now most tempered products have not been subjected to optical working. However, the present invention shows that either of these choices can be utilized. In a Maksutov, Bowers, or Pfenning type of catadioptric system, a previously tempered plate could be etched after figuring. Again, in these applications, the edges would be preferably rounded and polished to reduce susceptibility to fracturing. These edging procedures would be the same for both approaches (tempering before or after application).

(a) Procure glass which is thermally temperable, i.e., one which has a temperature dependent coefficient of expansion upon cooling. Typically the minimum thickness would be a few percent larger than the final product size but, as mentioned before, the glass we would procure would be considerably thicker in order to obtain larger degrees in homogeneity.

(b) Edge and configure the part by grinding, such grinding to be done by the large number of sequential steps discussed elsewhere and using eight grades of grit, sequentially:
  (1) Rough grind with coarse grit such as number 60 until the approximate shape is obtained. This would remove all but the last few percent of the thickness of the glass.
  (2) Rough grind with grit 80 until all evidence of grit 60 damage is removed and continue to grind to within an even closer approximation to the final dimension. The grinding time and effort would be considerably longer than in step (1).
  (3) Use number 120 grit to remove all evidence of number 80 grit grinding damage and continue to grind to even closer.
  (4) Subsequent use of 5 more grit sizes which are sequentially smaller down to a final grit of about 800 emery. In each case the damage of the previous grit size grinding is removed and then grinding continues to ensure all articles and residue from earlier grinding steps have broken out and been washed out of the part. These grinding procedures are done also to the edges and corners of all portions of the glass at the same time before proceeding.

(c) Polishing across the optical surface is now done using a pitch lap base. In the case of the edges and corners, the pitch lap may be impregnated into paper or felt. Coarser polishing can be done with substances such as cerium oxide or barnesite for a coarse polishing and configuring, and then rouge would be used to clean up the damage and evidence of rough polishing.

(d) Lightly etch the part with 10% ammonium fluoride/ammonium bifluoride solution until all residual polishing damage is exposed (i.e. remove 2 to 20 microinches).

(e) Repolish the part until the exposed damage illuminated by the ammonium fluoride/ammonium bifluoride etch is removed and then continue polishing for a short period of time.

(f) lightly etch again as in (d).

(g) Polish again with rouge as in (e).

(h) Repeat (e), (f), and (g) until no evidence of residual damage to the surface is left, or until the surface reaches an angstrom level of minimal value, i.e. 1 to 4 angstroms.

(i) Use as is at this point, or go to step (j).

(j) Thermally temper the art by heating the part to a temperature safely below the softening temperature and then quench it in a liquid salt or liquid metal so as to render the part in compression on the outer surfaces.

EXAMPLE 3

Flat mirrors for scanning or for folding optical systems

Flat faces on multifaceted external and internal scanning wheels or conventional flat mirrors are often made of highly polished metal because they are subject to vibration, shock and high centrifugal force (e.g. 10,000 rpm is not uncommon). Other flat scanning mirrors are subject to high vibration in a flip flop mode. The problem is that optical reflection in metal parts which can be polished or diamond turned is at best only approaching that available with glass polished surfaces. For the ultimate in low scatter surfaces, vitreous materials such as ceramics, silicates and glass are superior. This invention allows the strengthening of such mirrors and scanner mirrors to the point where glass can be used in any application normally using metal.

Procedure

The procedure used for fabrication of flat mirrors for scanning or for folding optical systems is the same as for corrector plates in Example 2, above.

EXAMPLE 4

Glass photographic plates used to support photographic emulsions, such as in curved focal plane applications in catadioptric optical systems and in parabolic systems Up until now, optical designs such as cameras and telescopes needed to have flat fields. This is because the glass used to support either spectroscopic photographic plates or ordinary photographic plates would have to have been subjected to curvatures which were unattainable. Typically, glass plates have been able to achieve a curvature of 80 inches radius for use in large Schmidt cameras operating at f/ratios of four or six or eight. In order to operate at f/ratios of f/1 or f/2, optical systems had to contain field flattening elements in order to render the photographic or image reception surface nearly flat. This required field flattening lenses with great absorption in the spectral regions of interest. This invention would allow both a larger field of view and/or a much smaller radius of curvature, and small f/number or a combination of all three.

Procedure

In this application, the glass need not be transparent, only translucent, so that the film can be viewed in an analyzing machine. Ideally, the plates supporting the emulsion should be thin, but this invention will even permit the plates to be thicker and stronger since this invention provides for greater bendability in the plates. The surfaces of these plates need to be smooth enough to prevent the emulsion being built up non-uniformly when bonded to the glass. That emulsion should be prevented from removing portions of the glass by tearing out because of microscratches beneath. Additionally, all edges should be ground polished and smoothed. This not only eliminates micro cracks but removes all grinding compound inclusions. The glass is processed to give the best results for very thin plates down to even a few thousandths of an inch thicknesses as follows:

(a) Take float glass from a floating process supplier. The float glass could be soda-lime-silicate glass which is available from various float glass manufacturers. The exact composition of these glasses are held to be proprietary by the manufacturers. Borosilicate and other readily available glass can also be used.

(b) If further thinning is required, reroll the float glass per this invention as shown in FIG. 1A in a suitably-closed environment. In both cases (a) and (b), the plate is usually flat enough for this application without polishing.

(c) Edge the photographic plate by grinding and polishing using the felt or paper in the polishing exercise. The corners can be rounded over because the plate can be held where the edges do not show in the optical system, Use of the sequential preparation steps outlined in Example 2 (procedure steps (b) and (c) above), will result in a satisfactory edge.

(d) Etch part in 4% nitric acid, 6% hydrofluoric acid solution to remove about 200 microinches from both sides and all edges.

(e) Use as is at this point, or go to step (f).

A series of parts were made according to this teaching, by etching various amounts from their surfaces and edges. FIG. 7 shows the results. It can be seen that near to a removal amount of 200 microinches, a dramatic improvement in strength took place, reaching 525,000 psi in a sample 4 in. by 4 in. by 0.032 in. thick. For specific glass compositions and thicknesses, the exact etch depth value for attaining maximum strength would vary around this nominal value, and could be optimized by trials at various etch depth values near this value but generally in the range of between about 100 to 400 microinches. This procedure applies for other materials such as titanium, germanium, silicon, beryllium and quartz.

(f) Ion exchange the part by dipping it into a potassium or other heavier than silicon salt (the required temperature time and bath constituents are given in the prior art). Some parts made by skipping step (d), and going directly to step (f) were also fabricated and tested. Strengths of 320,000 psi to 415,000 psi were realized in samples 4 in. by 4 in. by 0.017 in. thick.

An alternate process which would be best for plates that are thicker, i.e. one to three millimeters, is as follows:

(a) Obtain float glass as above.

(b) Cut the glass into round disks by flame cutting or by sawing followed by an edge-rounding-off etch.

(c) Reroll the glass to about the thickness desired. p1 (d) Examine for roundness, correct if necessary, and determine how much to reroll.

(e) Continue to reroll and etch as required until final thickness desired is obtained with roundness required.

(f) Heat and thermally quench in the final reroll operation.

(g) Etch the glass to remove approximately 0.00020 in. from each side, after determining optimum amount.

EXAMPLE 5

Applications where vitreous materials and brittle semiconductor materials are bonded to a support, e.g. silicon, germanium or glasses bonded to ductile metals such as titanium, stainless steel, or molybdenum When cooled, the bonding materials (e.g. epoxies, RTVs, silicones) often pull a segment of the vitreous materials from itself due to minor micro cracks in the vitreous material. Such cooling can easily occur in cryogenic or space applications. In one experiment, even a blob of such bonding material lying freely on the surface of a semiconductor has pulled a small segment from the surface upon rapid cooling (e.g. 50 degrees centigrade per minute over a two minute period). The invention, in reducing micro cracks and surface imperfections, allows for more rigorous use of vitreous materials in cryogenic applications.

Procedure

Method I for germanium and silicon and other semiconducting materials:

(a) take blank and make surfaces as flat as possible by sequential grinding and polishing as described above;

(b) round the corners as above and in FIG. 5 to relieve stresses;

(c) etch using a bath capable of removing selected amount of materials sufficient to remove all micro cracks or to render them ineffective for further cracking; and (d) make samples according to the procedure to be tested.

Method II for vitreous materials:

(a) float glass blanks which can be rerolled to render them the proper thickness;

(b) grind and polish above;

(c) etch to remove 0.0002 inches on each side and edges; and/or (d) ion exchange the parts.

EXAMPLE 6

Windows for ground, sea, air, and space vehicles (commercial, recreational, or military)

Previously these windows had to be quite thick in many cases to handle over pressure, e.g. deep sea applications, Venus probes (dense atmospheres). Windows often are required to have a monocoque shape in order to contribute to part of the strength of a building or structure. This invention will allow more relaxation of thickness and stress tolerances by providing a more rugged component for such purposes, These windows are often subjected to dust and sand impinging on their surfaces and these applications would also benefit from this invention by providing a hard and structurally sound surface.

Procedure (a) Obtain glass from manufacture which is either thermally temperable or ion exchangeable.

(b) Form the part.

(c) If thermally temperable, it may be tempered prior to etching or post tempered.

(d) If ion exchangeable, first etch the part and then ion exchange it.

(e) In either case, etching alone may suffice (without tempering).

In other words, for thermally tempered glass, temper it and then etch it, or etch it and then temper it, but for ion exchanged glass, etch it and then temper it. Alternately, just etch the part ONLY in either case.

EXAMPLE 7

Fusible links

Fusible links are fuse points or specified breakage points in structure where failure is desired to occur at a predictable and selectable level of stress or strain. In the past when wood or metal has been used, there has been a problem rising due to their having a yield point prior to breaking point. Such materials are ductile and will pull (like taffy) before finally breaking. Thus, they do not have a specific point in which they are observed to fail catastrophically. Glasses, however, have substantially no yield point and fail at the time they yield. However, in the past the point of failure of glasses and vitreous materials have been quite variable, often by factors of ten (e.g. over range of 6,000 psi to 60,000 psi). The invention can guarantee a specific, repeatable value of failure within five to ten percent. This will greatly improve fusible link applications such as employed in munitions, explosive bolts and releases and other ordinance.

Procedure

Depending upon the level of stress and precision required, these could be prepared in one of two ways. If prepared as were glass photographic plates (Example 4 above), they would have nominal strength and reliability of the failure level. If prepared as corrector plates are done (as in Example 2 above), they would have even more precise limits of failure and a higher general level of failure. This extra strength capability and greater precision would be due to the surfaces both being polished as in Example 2 above, as opposed to accepting a surface as rolled or as floated as in Example 4 above.

EXAMPLE 8

Applications where electro- or ferromaqnetic effects render metals substantially useless In certain structural supports, the environment contains electrostatic and electromagnetic and ferromagnetic interference. Isolators for high tension wires, voice coils in loud speakers, supports for aircore transformers, variable capacitors, and struts supporting ion engines in a critically damped condition all are affected by electro- or ferromagnetism. The invention can provide a high strength spring quality material for such applications which could be relied upon not to fail at designed loads.

Procedure

These items also could be prepared in two levels of effort just as were the fusible links. Whether Example 2 methodology or Example 4 methodology were employed would depend upon the application.

EXAMPLE 9

Holographic plates

Much progress has been made recently in the field of holography. This involves the fabrication of large thin discs of glass on which film is supported in order to impress a holographic pattern. These have had to be rather thick and heavy up until now because of glass' unpredictable failure mode and stress level at failure. The invention allows the holographic plates to be made of minimum thickness since the principal purpose of a holographic plate is to replace otherwise very heavy mirrors and lenses with analogs cast in the film mounted to a glass support. The invention allows the principle of holographic replacement of lenses and mirrors to proceed to a level not heretofore achieved.

Procedure

Holographic plates require photographic processing and if prepared as photographic plates would be exposed to many liquids (i.e. bleach, hypo, water, acetic acid) which could cause surface damage, especially with a thick emulsion layer to hold the "moisture" in intimate contact with one surface. Such plates could have their surface properties substantially improved (prior to the addition of the emulsion layer) just by etching the surfaces after floating, rolling, or after polishing and figuring.

They could also, of course, be ion exchanged or rolled and tempered, or etched after or before tempering or ion exchanging.

One would start with float glass and edge this by sequential grinding and polishing as above. It could then be etched to a depth of 200 microinches from each side and all edges and it could then be ion exchanged as well. A higher quality holographic plate could be prepared in the same manner but after floating the glass it could be rerolled to a precise thickness of lesser value or sequentially ground and polished down, prior to etching it. And, further, instead of ion exchanging it, it could be thermally tempered. Holographic plates prepared in such a manner are usually bonded to a structural support or held against it by a vacuum chuck. If a support is curve curgenerated by figuring as is done conventionally, the support could even be a thicker piece of ordinary glass having the same thermal properties. The invention, thus, would be to prepare the polished sheet which is then bonded to be prefigured support. This polished sheet would have properties far superior to a large thick glass support of itself. This latter application of bonding the structural sheet to a thicker substrate would of course only be applicable to reflection type holograms, whereas the above sequence for making the thin plate could apply to a transmission hologram as well.

While the invention has been described in detail and with reference to specific embodiments thereof, it would be apparent to one skilled in the art that various changes and modifications can be made therein without departing from the spirit of the invention which is intended to be limited only by the scope of the appended claims.

What is claimed is:

1. A method for increasing the breaking stress of a glass plate wherein said glass plate includes a top surface, a bottom surface and at least one side surface, wherein each of said surfaces has a slope variance which is below about 10 microinches per inch of surface distance and wherein each of said surfaces has an rms surface roughness of below about 0.15 microinches, said method comprising the step of uniformly etching glass from each of said surfaces to provide an etched glass plate having an etched top surface, etched bottom surface and at least one etched side surface, wherein sufficient glass is uniformly removed from each of said glass plate surfaces so that each corresponding etched glass plate surface has a slope variance below about 10 microinches per inch of surface distance and an rms surface roughness of below about 0.15 microinches and wherein each of said etched glass plate surfaces is displaced inward to a depth in the range of between about at least 100 microinches to no more than 400 microinches.

2. A method according to claim 1 wherein said glass plate is made from glass selected from the group consisting of soda-lime-silicate glass and borosilicate glass.

3. A method according to claim 1 wherein said glass plate has a thickness of below about 0.10 inch.

4. A method according to claim 3 wherein said glass plate is a photographic plate or a holographic 5. A method according to claim 4 wherein said etching removes glass from said surface to a depth of about 200 microinches.

6. A method for increasing the breaking stress of a glass plate according to claim 1 which includes the additional steps of:
  beginning with a blank of raw material substantially thicker than the desired plate and reducing the thickness of the blank to form a glass object therefrom;
  forming edges on the object to define the limits of the object; and
  polishing all edges and surfaces of the glass object resulting in the glass plate exhibiting an overall surface irregularity of greater than the ±10 microinches per inch of surface distance.

7. A method as set forth in claim 6 wherein the step of reducing the thickness of the raw material is performed by grinding.

8. A method as set forth in claim 6 wherein the step of reducing the thickness of the raw material is performed by chemical milling.

9. A method as set forth in claim 6 including the step of forming shaped edges on the object intermediate the steps of forming the edges and polishing the edges and surfaces.

10. A method as set forth in claim 9 wherein the object exhibits chamfered edges as the result of the step of forming shaped edges.

11. A method as set forth in claim 9 wherein the object exhibits rounded edges as the result of the step of forming shaped edges.

12. A method as set forth in claim 9 wherein the object exhibits undercut edges as the result of the step of forming shaped edges.

13. A method as set forth in claim 6 including the step of tempering the object after the step of polishing the edges and surfaces of the plate.

14. A method as set forth in claim 13 wherein the step of tempering includes the step of chemically strengthening of the glass object.

15. A method according to claim 1 wherein sufficient glass is removed from said glass plate surfaces so that said etched glass plate surfaces are at a depth of about 200 microinches.

* * * * *

UNITED STATES PATENT AND TRADEMARK OFFICE
CERTIFICATE OF CORRECTION

PATENT NO. : 4,911,743
DATED : March 27, 1990
INVENTOR(S) : JOHN P. BAGBY

It is certified that error appears in the above-identified patent and that said Letters Patent is hereby corrected as shown below:

Column 15, Line 13, Claim 4, after "holographic", insert --plate.--.

Column 15, Line 28, Claim 6, between "of" and "greater", insert --no--.

Column 5, Line 10, change "re" to --are--.

Signed and Sealed this

Twelfth Day of November, 1991

Attest:

HARRY F. MANBECK, JR.

*Attesting Officer*      *Commissioner of Patents and Trademarks*